Oct. 9, 1962  A. TEPLITZ  3,057,239
SINGLE-CUT DRUM-TYPE SHEAR WITH PROJECTABLE CUTTER
Filed May 14, 1958  3 Sheets-Sheet 1
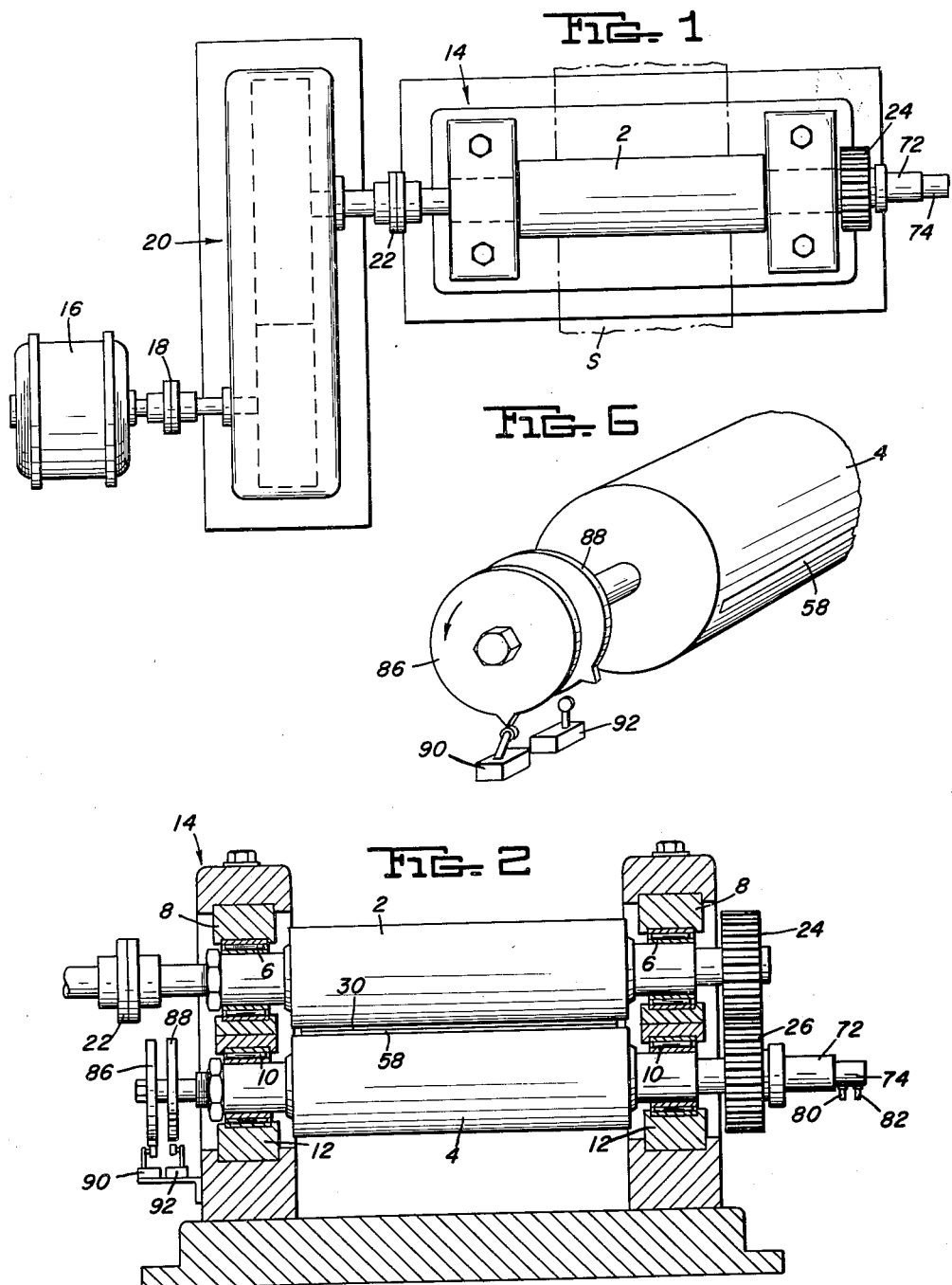
INVENTOR
ALFRED TEPLITZ
By Donald G. Dalton
Attorney

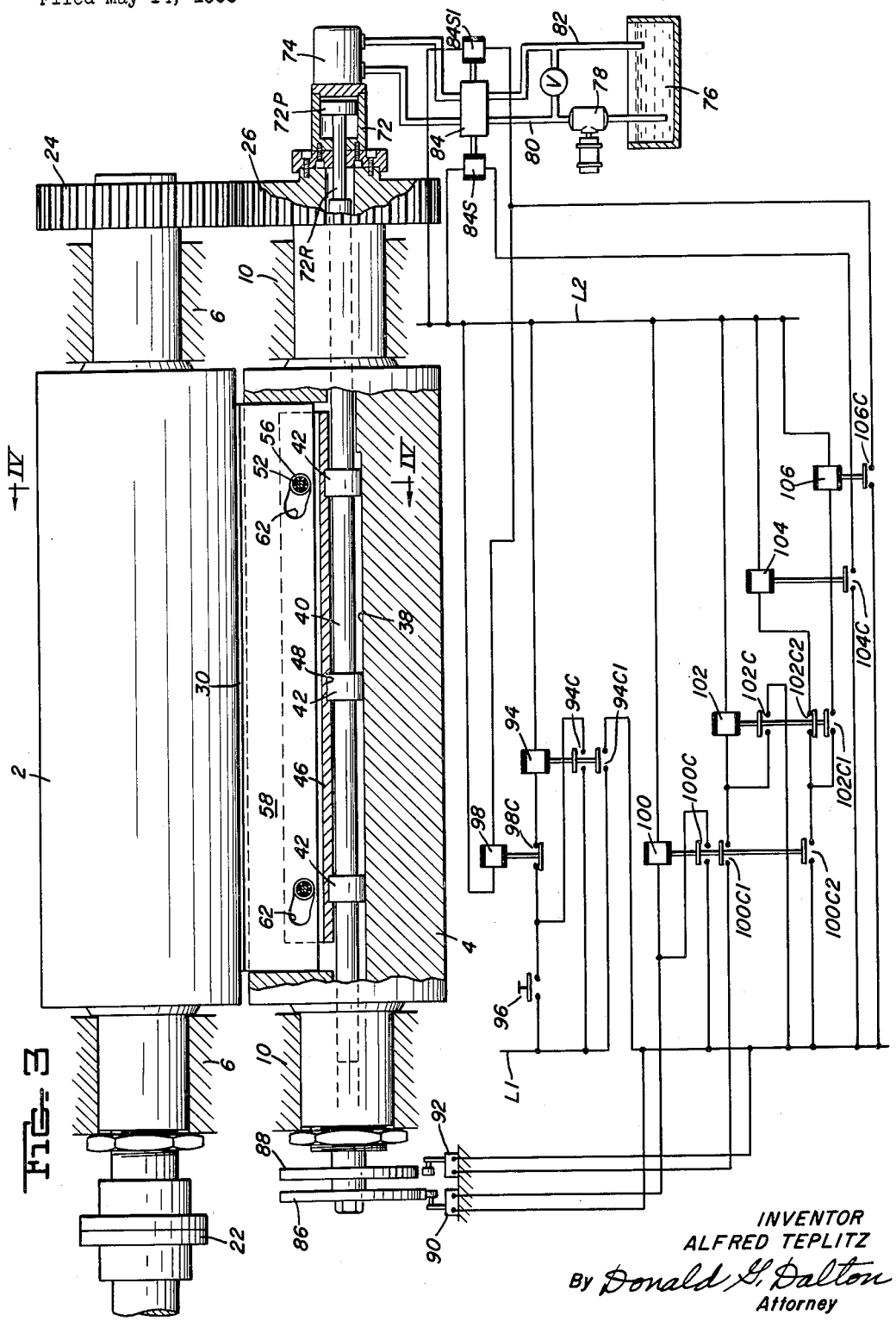

Oct. 9, 1962 A. TEPLITZ 3,057,239
SINGLE-CUT DRUM-TYPE SHEAR WITH PROJECTABLE CUTTER
Filed May 14, 1958 3 Sheets-Sheet 3

INVENTOR
ALFRED TEPLITZ
By Donald G. Dalton
Attorney

United States Patent Office 3,057,239
Patented Oct. 9, 1962

3,057,239
SINGLE-CUT DRUM-TYPE SHEAR WITH PROJECTABLE CUTTER
Alfred Teplitz, Pittsburgh, Pa., assignor to United States Steel Corporation, a corporation of New Jersey
Filed May 14, 1958, Ser. No. 735,222
1 Claim. (Cl. 83—337)

This invention relates to a single-cut drum-type shear and more particularly to a shear for cutting moving steel strip. Such strip is often processed in continuous lines and after processing is coiled. After a coil is formed the strip is sheared and a new coil is started. It is desirable to shear the strip without slowing down the processing line. The shears most commonly used for terminating coils of strip are stationary shears having a fixed blade and a coacting moving blade arranged transversely to the direction of strip travel or rotating drum shears. When using the first type of shear, the line speed must be reduced to about 400 feet per minute. When using the second type of shear the rotating drum must be brought from rest to line speed in less than one revolution of the drum and then, after the cut is made, they must be brought to rest in less than one revolution of the drum. This requires a large drive motor and rather complicated controls.

It is therefore an object of my invention to provide a drum-type shear which will make a single cut and which may run at the speed of the strip at all times or be brought up to speed and slowed down gradually.

Figure 4:
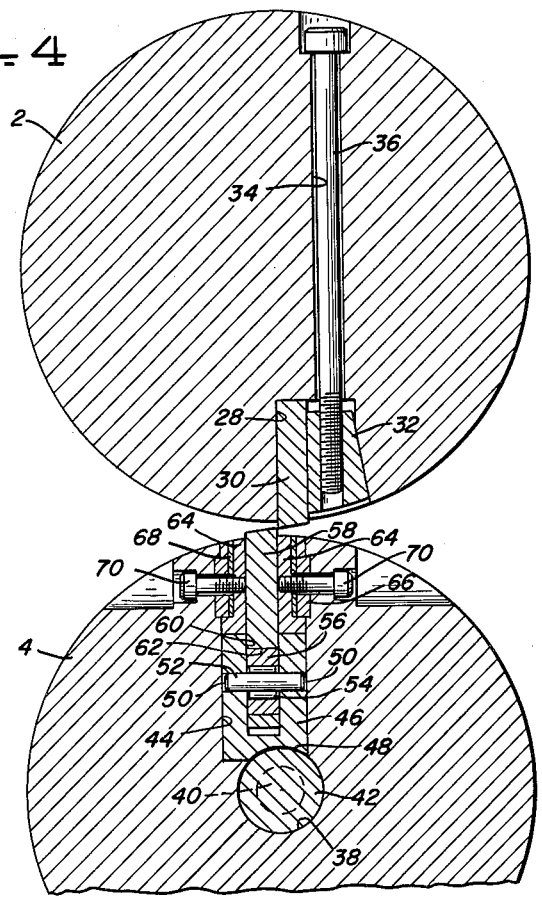
Figure 5:
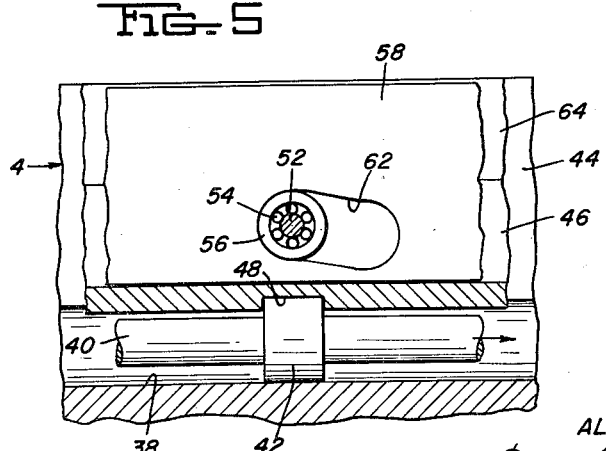

This and other objects will be more apparent after referring to the following specification and attached drawings, in which:

FIGURE 1 is a plan view of the shear of my invention;
FIGURE 2 is an elevation, partly in section, of the shear of FIGURE 1;
FIGURE 3 is an enlarged elevation, with parts broken away, and showing the electrical and hydraulic controls;
FIGURE 4 is a section taken on the line IV—IV of FIGURE 3;
FIGURE 5 is an enlarged fragmentary view of a portion of FIGURE 3 showing the parts in a different position; and
FIGURE 6 is a perspective view of the left end of the lower shear drum.

Referring more particularly to the drawings, the reference numeral 2 indicates the upper drum of a rotating shear. A drum 4, which cooperates with the drum 2, is mounted directly beneath the drum 2. The drum 2 is mounted for rotation in anti-friction bearings 6 which in turn are mounted in chocks 8. The lower drum 4 is mounted in anti-friction bearings 10 which in turn are mounted in chocks 12. The chocks 8 and 12 are mounted in a housing 14. The drum 2 is driven from a motor 16 through a flexible coupling 18, gear reduction unit 20 and a flexible coupling 22. A gear 24 is mounted on the shaft of drum 2 and is in mesh with a gear 26 mounted on the shaft of the drum 4. The upper drum 2 has a longitudinal slot 28 therein for receiving a fixed knife 30 and a wedge block 32. Spaced holes 34 are provided in the drum 2 for receiving bolts 36 which are threaded into wedge blocks 32. Thus, by tightening up on the bolts 36, the wedge block 32 clamps the knife 30 in place. The lower drum 4 has an axial opening 38 therethrough for receiving a push rod 40 which has enlarged portions 42 thereon for a purpose which will appear later. The drum 4 has a longitudinal slot 44 therein extending inwardly to the rod 40. An axially movable frame 46 is mounted in the slot 44 and has transverse slots 48 therein for receiving the enlarged portions 42 of the rod 40. The frame 46 has spaced holes 50 therein for receiving pins 52. Rollers 54 surround each of the pins 52 and in turn are surrounded by a roll 56. A cutter blade 58 is mounted in the slot 44 and is of the same length as the slot. The inner end of the blade 58 extends into a radial slot 60 in the frame 46. The inner end of the blade 58 has two spaced apart inclined slots 62 which receive the rolls 56. The slots 62 preferably have flat portions at each end as shown which act as an additional safeguard to prevent drifting of the knife blade. The knife 58, rolls 56, pins 52 and frame 46 constitute a single assembly that fits into slot 44. This assembly is positioned and held radially and tangentially by fillers 64 and 66 and shims 68 which have aligned openings for receiving cap screws 70. The openings in fillers 64 are threaded. A cylinder 72 is attached to the end of the shaft of drum 4 and has a piston 72P and piston rod 72R which is connected to the push rod 40. The cylinder 72 is a standard rotating, double acting type, having a member 74 through which oil is delivered. Oil for the cylinder 72 is provided from a reservoir 76 by means of a pump 78 and supply conduit 80. Oil is returned from the cylinder through a conduit 82. A four-way valve 84 is provided for controlling the flow of oil through the conduits 80 and 82. The position of the valve 84 is controlled by solenoids 84S and 84S1. Two cams 86 and 88 are mounted on that end of the shaft of drum 4 opposite the cylinder 72. A limit switch 90 is mounted for operation by the cam 86 and a second limit switch 92 is mounted for operation by the cam 88. The cams 86 and 88 are so arranged that they will operate the switches 90 and 92 once each revolution of the drum 4 with the limit switch 92 being operated a short time before limit switch 90. The control circuit for operating the solenoids 84S and 84S1 as shown in FIGURE 3 obtains power from lines L1 and L2. A relay coil 94 having normally open contacts 94C and 94C1 is arranged in series with a push button switch 96 and with normally closed contact 98C operated by a time delay relay coil 98. The contact 94C is arranged in parallel with the switch 96. Limit switch 90 is arranged in series with a relay coil 100 having three normally open contacts 100C, 100C1 and 100C2. Contact 100C is arranged in parallel with switch 90. Limit switch 92 and contact 100C1 are arranged in series with relay coil 102 which has two normally open contacts 102C and 102C1 and a normally closed contact 102C2. Contact 102C is arranged in parallel with switch 92 and contact 100C1. Contacts 100C2 and 102C2 are mounted in series with relay coil 104 which has a normally open contact 104C. A relay coil 106 is mounted in series with contact 102C1 and in parallel with contact 102C2 and relay coil 104. Relay coil 106 has a normally open contact 106C. Contact 104C is mounted in series with solenoid 84S and contact 106C is mounted in series with solenoid 84S1. Relay coil 98 is mounted in parallel with solenoid 84S1.

The operation of my device is as follows:

The drums 2 and 4 are set so that the blades 30 and 58 will meet in the correct relationship shown in FIGURE 4 to shear a strip S as it passes between the drums 2 and 4 and the switches 90 and 92 are arranged so that they will cause the blade 58 to project outwardly at the desired time. When the operator sees that it is time to sever the strip so as to complete one coil and start a new coil, he presses the push button switch 96. This energizes relay coil 94, thus closing its contact 94C to hold it energized when the push button 96 is released. Contact 94C1 is also closed so as to deliver current to the rest of the control from the lines L1 and L2. Then the next time the cam 86 operates limit switch 90 the relay coil 100 will be energized. This will be when the blade 58 has traveled some distance (such as through an arc of 15°)

past its cutting position. Energization of relay coil 100 will close its contact 100C to lock it in and also closes contacts 100C1 and 100C2. Closing of contact 100C2 energizes relay coil 104 to close its contact 104C, thus energizing solenoid 84S. Energization of solenoid 84S moves four-way valve 84 to cause oil to flow through supply conduit 80 to the left end of piston 72P. This causes the rolls 56 to move to the right to the position shown in FIGURE 3, thus projecting the knife 58 so that the strip S will be sheared the next time the knives 30 and 58 reach the position shown in FIGURE 4. Continued rotation of drum 4 next operates limit switch 92. This energizes relay coil 102 and locks it in. This also causes contact 102C2 to open thus deenergizing relay coil 104 and solenoid 84S. At the same time contact 102C1 closes to energize relay coil 106 and close its contact 106C. This energizes solenoid 84S1 which operates valve 84 to deliver oil to the right end of piston 72P which moves the rolls 56 to the left to the position shown in FIGURE 5, thus causing the shear knife 58 to retract out of the path of travel of strip S. At the same time, time delay relay coil 98 is energized which, after a fixed interval, opens its contact 98C to deenergize relay coil 94 and return the entire system to its original position. The knife of the upper drum, instead of being fixed, may be movably mounted in the same manner as the knife of the lower drum and be projected and retracted in unison therewith.

While one embodiment of my invention has been shown and described it will be apparent that other adaptations and modifications may be made without departing from the scope of the following claim.

I claim:

Apparatus for transversely shearing a longitudinally moving object comprising a pair of rotating drums between which the object passes, means for rotating said drums so that their peripheral speed is approximately equal to the longitudinal speed of said object passing therebetween, one of said drums being substantially of solid construction having an axial opening therethrough, an axially movable rod in said opening supported at a plurality of points along said opening, a radial slot in said last named drum extending from said axial opening to the outer surface of said drum on one side of said axial opening only, a bifurcated frame including spaced side walls providing a groove therebetween mounted in said slot, said frame being of less length than the length of said slot, a pair of axially spaced rolls in said groove, means mounting said rolls to said side walls in said groove for movement with said frame, means providing a connection between said rod and said frame whereby axial movement of said rod produces corresponding movement of said frame, means connected to said drum preventing radial movement of said frame, a radially movable cutter blade mounted in said groove and extending radially outward into said radial slot, means preventing axial movement of said blade, said blade having a pair of slots therein receiving said rolls, each of said slots having an intermediate sloping portion with a flat portion at each end thereof, and means for moving said rod and frame axially to move said blade radially between a cutting position and a retracted position out of the path of travel of said object, said rolls resting on said flat portions in said cutting and retracted positions.

References Cited in the file of this patent

UNITED STATES PATENTS

| | | |
|---|---|---|
| 322,552 | Northrup | July 21, 1885 |
| 465,427 | Cox | Dec. 15, 1891 |
| 2,451,948 | Hawthorne | Oct. 19, 1948 |
| 2,818,115 | Parker | Dec. 31, 1957 |